UNITED STATES PATENT OFFICE.

HENRY M. WELLS, OF NEW YORK, N. Y.

IMPROVEMENT IN PROCESSES OF DISINFECTING BUILDINGS, SHIPS, &c.

Specification forming part of Letters Patent No. 120,355, dated October 24, 1871.

*To all whom it may concern:*

Be it known that I, HENRY M. WELLS, a surgeon in the navy of the United States, of the city, county, and State of New York, have invented a certain new and Improved Mode or Process of Fumigation, of which the following is a specification:

My invention consists of the process of impregnating the atmosphere of a building, ship, or other place with any liquid deodorizing disinfectant agent by the use or employment of a spray or jet of steam.

The steam is used to atomize and rapidly convey the disinfectant, and by its heat will volatilize the same, and will present the disinfectant in its most diffused and rarefied state, and ultimately combine it with the surrounding mediums, so that condensation will occur less rapidly than it would were it presented in the simple state of atomization. The air of a vessel or building will thus be strongly and quickly charged by the disinfecting agent used, and all malaria and everything of a cryptogamic origin will be destroyed, and rats, &c., also exterminated.

The apparatus I use to accomplish this purpose is the machine invented by and patented to Clark Fisher, first assistant engineer in the navy of the United States, dated July 23, 1867, for mode of burning hydrocarbon liquids. This machine I find by experiment is the best that can be used for the purpose sought by me, for the peculiar form of the orifice known as "Fisher's jet" insures a thorough combination of the steam with the disinfecting agent, and which will issue in form of vapor or a spray. In this machine the atmosphere is drawn or "sucked" in and mingles with the disinfectant, and is injected into the apartment in a spray, as above stated.

By the employment of a Fisher jet in connection with my method of fumigation the pipe containing the disinfecting liquid is completely enveloped with steam, thus volatilizing as well as atomizing the disinfectants before their escape into the apartment designed to be purified.

It will thus be seen that my process consists in purifying the atmosphere of buildings, vessels, &c., which have been rendered unwholesome by infection or miasma, by the employment of carbolic acid or any other known disinfecting agent by atomizing and volatilizing the disinfectant used and injecting the same into the atmosphere in the form of vapor by means of steam.

Having described my invention, what I claim, and desire to secure by Letters Patent, is—

The method of purifying vessels, buildings, &c., by injecting disinfectants in a spray by steam, said disinfectants being atomized and volatilized, substantially in the manner described.

In testimony whereof I have signed my name in the presence of two subscribing witnesses.

H. M. WELLS.

Witnesses:
WM. F. MCNAMARA,
K. N. JONES. (98)